United States Patent
Smay (10) Patent No.: US 6,311,931 B1
(45) Date of Patent: Nov. 6, 2001

(54) BI-DIRECTIONAL MOMENTUM BIAS SPACECRAFT ATTITUDE CONTROL

(75) Inventor: John W. Smay, Redondo Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/466,244

(22) Filed: Dec. 17, 1999

(51) Int. Cl.$^7$ ..................................................... B64G 1/24
(52) U.S. Cl. ............................................. 244/164; 244/165
(58) Field of Search ..................................... 244/164, 165

(56) References Cited

U.S. PATENT DOCUMENTS

| | | | |
|---|---|---|---|
| 3,741,500 | * | 6/1973 | Liden ..................................... 244/165 |
| 5,112,012 | * | 5/1992 | Yuan et al. ............................. 244/165 |
| 5,261,631 | * | 11/1993 | Bender et al. ......................... 244/165 |
| 5,308,024 | * | 5/1994 | Stetson, Jr. ............................ 244/165 |
| 5,611,505 | * | 3/1997 | Smay ..................................... 244/165 |
| 5,692,707 | * | 12/1997 | Smay ..................................... 244/165 |

* cited by examiner

Primary Examiner—Charles T. Jordan
Assistant Examiner—Kevin Jakel
(74) Attorney, Agent, or Firm—Gates & Cooper LLP (57) ABSTRACT

A method and apparatus for controlling a spacecraft having a first axis is disclosed. The apparatus comprises a momentum wheel unidirectionally rotatable about a spin axis substantially co-aligned with the first axis; a momentum wheel mount for tilting the momentum wheel about at least one of two axes substantially orthogonal to the spin axis; and a processor in communication with the momentum wheel and the momentum wheel mount. The processor commands either the momentum wheel speed or the momentum wheel tilting to control the attitude of the spacecraft in a first orientation and in a second orientation inverted from the first along the first axis, using the same control law. The method comprises the steps of tilting the momentum wheel according to the control law as applied to a spacecraft attitude command and a measured attitude of the spacecraft; angularly displacing the spacecraft from a first orientation to a second orientation substantially inverted from the first orientation, and tilting the momentum wheel according to the same control law applied to the spacecraft altitude command or a new command and the measured attitude of the spacecraft. The article of manufacture comprises a program or data storage device tangibly embodying instructions to perform the method steps described above.

20 Claims, 9 Drawing Sheets

BI-DIRECTIONAL MOMENTUM BIAS SPACECRAFT ATTITUDE CONTROL

BACKGROUND OF THE INVENTION

1. Field of the Invention

The present invention relates to systems and methods for controlling spacecraft, and in particular to a system and method for operating a momentum bias controlled spacecraft in an inverted orientation without requiring any control law, or momentum wheel modifications.

2. Description of the Related Art

Various systems of attitude steering and momentum management for spacecraft are known today. These spacecraft use different systems of momentum wheel arrays for various orbit geometries and mission purposes.

Momentum bias stabilized spacecraft are very desirable due both to the inherent attitude stability afforded by the gyroscopic stiffness associated with the momentum and to the yaw attitude sensing facilitated by orbital coupling with the momentum bias. The orbital coupling with the momentum bias allows yaw attitude (which is difficult to measure with sensors) to be deduced from a roll attitude sensor.

Typically, the momentum bias mechanization is only useful for small attitude motion control about a nominal attitude with the bias nominally orbit normal. However, for selected spacecraft applications, it can be often useful to operate the spacecraft in an upright orientation (pitch axis anti-orbit-normal) at some times during the mission, and in an inverted orientation (pitch axis orbit-normal) during other portions of the mission. For example, this capability is useful in establishing new antenna coverage areas or in providing for other new missions.

Further, there are a large number of momentum bias stabilized spacecraft presently on orbit. As a result of proliferation in the number and uses of spacecraft, coupled with the aging and replacement of such satellites, the desire to move them and invert the attitude to establish new antenna coverage areas is becoming more frequent.

Early momentum bias spacecraft were controlled by thrusters and magnetic torquers that apply external torques. The attitude control of such spacecraft is unstable when inverted because the relative sign of the momentum bias and orbit rate rotation is reversed. Consequently, to stabilize such a spacecraft in the inverted state it is necessary to (1) reverse the direction of the momentum wheel rotation, or (2) design and implement a new control compensation, or (3) both (1) and (2).

SUMMARY OF THE INVENTION

From the foregoing, it is apparent that a system and method is needed for currently deployed momentum bias spacecraft to operate in both a nominal and an inverted orientation. The present invention satisfies that need. In this invention we teach that when a momentum bias stabilized spacecraft is controlled by reaction wheels (or equivalent internal torques) it can be operated in upright or inverted attitude with no change to the control architecture or implementation. This allows the many momentum bias spacecraft of this architecture on orbit to perform new and unforeseen missions.

To address the requirements described above, the present invention discloses a method, apparatus, article of manufacture, and a memory structure for controlling a spacecraft having a first axis. The apparatus comprises a momentum wheel unidirectionally rotatable about a spin axis substantially co-aligned with the first axis; a momentum wheel mount for tilting the momentum wheel about at least one of two axes substantially orthogonal to the spin axis; and a processor in communication with the momentum wheel and the momentum wheel mount. The processor commands either the momentum wheel speed or the momentum wheel tilting to control the attitude of the spacecraft in a first orientation and in a second orientation inverted from the first along the first axis, using the same control law.

The method comprises the steps of tilting the momentum wheel according to the control law as applied to a spacecraft attitude command and a measured attitude of the spacecraft; angularly displacing the spacecraft from a first orientation to a second orientation substantially inverted from the first orientation, and tilting the momentum wheel according to the same control law applied to the spacecraft altitude command or a new command and the measured attitude of the spacecraft. The article of manufacture comprises a program or data storage device tangibly embodying instructions to perform the method steps described above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
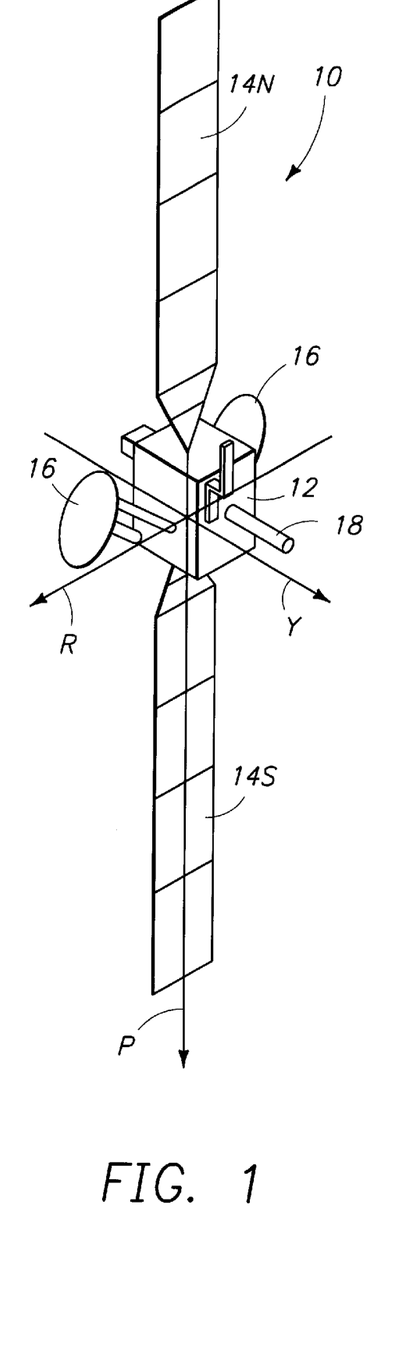
FIG. 1 shows a three-axis stabilized satellite to illustrate the improved system in accordance with the present invention.

FIG. 1 illustrates a three-axis stabilized satellite or spacecraft 10. The spacecraft is preferably situated in a stationary orbit about the Earth. The satellite has a main body 12, a pair of solar panels 14, a pair of high gain narrow beam antennas 16, and a telemetry and command omni-directional antenna 18 which is aimed at a control ground station. Since the solar panels are often referred to by the designations "North" and "South", the solar panels in FIG. 1 are referred to by the numerals 14N and 14S for the "North" and "South" solar panels, respectively.

The three axes of the spacecraft 10 are shown in FIG. 1. The pitch axis P lies along the plane of the solar panels 14N and 14S. The roll axis R and yaw axis Y are perpendicular to the pitch axis P and lie in the directions and planes shown. The antenna 18 points to the Earth along the yaw axis Y.

Figure 2:
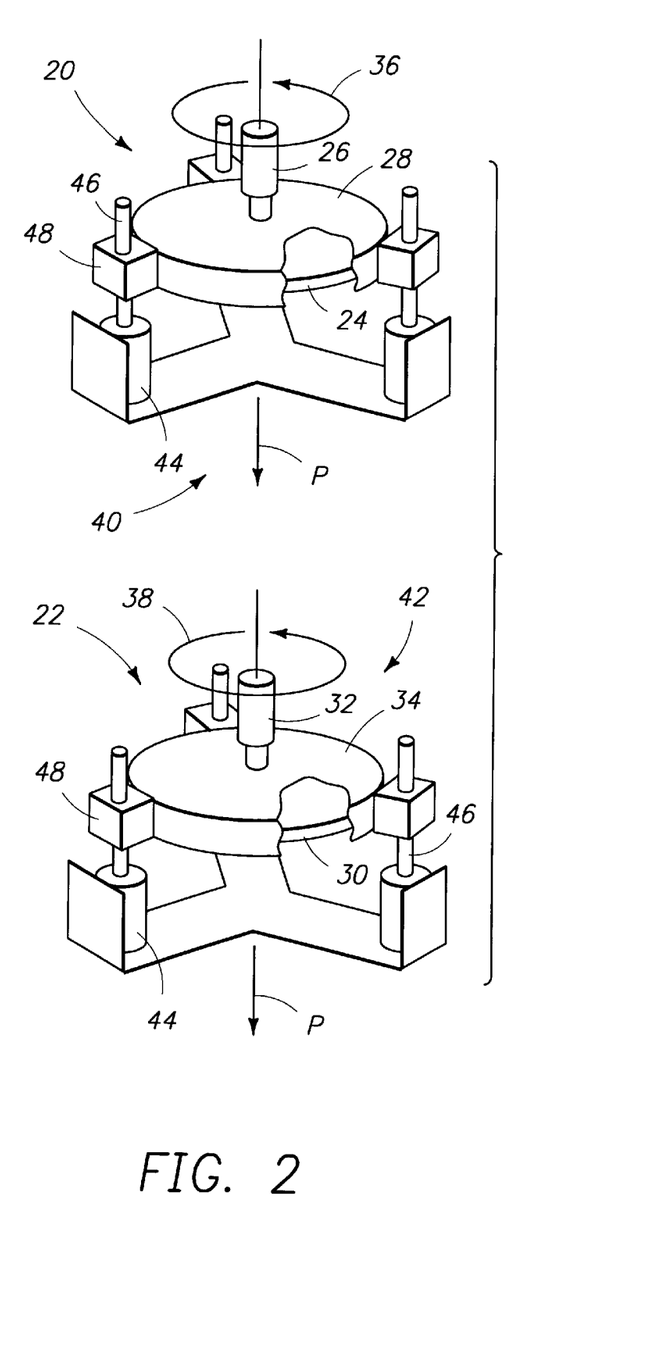
FIG. 2 illustrates a schematic view of a pair of gimbaled momentum wheels in accordance with the present invention.

The momentum for the spacecraft 10 is achieved by one or both gimbaled momentum wheel members 20 and 22. These are shown in FIG. 2. The momentum members 20 and 22 are disposed within the body 12 of the spacecraft 10 and are positioned with their spin axes parallel to each other and coaligned with the spacecraft pitch axis P.

Even though in accordance with the present invention, the two momentum wheels are positioned with their spin axes nominally co-aligned along the spacecraft pitch axis, it is understood that the momentum wheels could be co-aligned along another axis of the spacecraft and still perform in a similar manner in accordance with the present invention. Also, the present invention can be practiced with only one gimbaled active momentum wheel. If desired to achieve a required reliability value, a redundant second momentum wheel may be used, but this is not a required part of the present invention.

The momentum wheel member 20 includes a momentum flywheel 24 that is disposed on a shaft 26 within a housing 28 or similar mount. Similarly, momentum member 22 includes a momentum wheel 30 disposed on a shaft 32 within a housing 34 or similar mount. The momentum wheels 24 and 30 may be mechanically or magnetically supported and rotated about the axes of the shafts 26 and 32 as indicated by the curved arrows 36 and 38.

The momentum wheels 24 and 30 are spun to store spacecraft momentum as desired for the particular application or mission phase. Each wheel 24 and 30 is gimbaled about two axes orthogonal to a spin axis, as known in the art, or mounted on a two-degree-of-freedom flexible pivot arrangement 40 and 42. Each pivot arrangement 40 and 42 includes a plurality of stepper motors 44 and associated jackscrews 46. The housings 28 and 34 include a plurality of flanges 48 each having a threaded hole for engagement with an associated jackscrew 46. This arrangement allows the angular momentum of the wheel to be tilted from the nominal alignment with respect to the spacecraft body. In accordance with a practical application of the present invention, the angular momentum may be tilted between 0 and 45 degrees (although the invention is not limited to this range). Jackscrew mechanisms which could be used in accordance with the present invention are found, for example, in U.S. Pat. No. 5,112,012.

With limited angular travel of 45 degrees or less in accordance with a two-wheel array, most of the versatility of a control moment gyro (CMG) array is achieved, while avoiding the classical control torque singularity problems. Classical CMGs use spinning momentum wheels mounted in rotatable gimbals with continuous drive motors which can be rotated 90 degrees or more. When CMGs are rotated through large angles to generate torque, sometimes an undesirable situation develops which has a "zero" net torque.

The benefits and advantages of the present invention can be secured with the a spacecraft having a single momentum wheel, or multiple momentum wheels, as described in U.S. Pat. No. 5,692,707, entitled "Universal Spacecraft Attitude Steering Control System," issued to John Smay on Dec. 2, 1997, which is hereby incorporated by reference herein.

Figure 3:
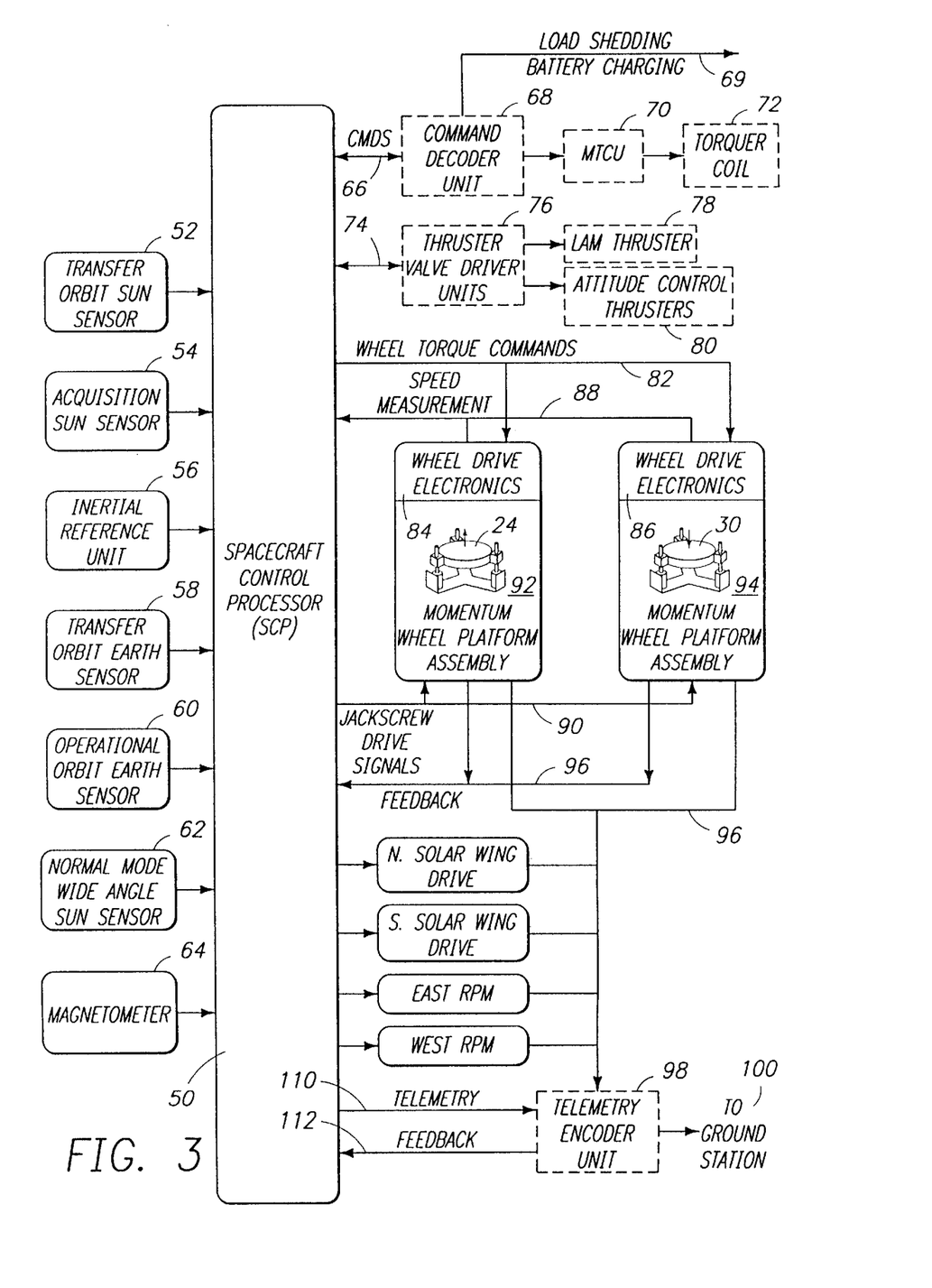
FIG. 3 illustrates a block diagram of a representative momentum agile attitude control system in accordance with the present invention.

FIG. 3 is a diagram depicting the functional architecture of a representative attitude control system. Control of the spacecraft is provided by a computer or spacecraft control processor (SCP) 50. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 50 comes from a number of spacecraft components and subsystems, such as a transfer orbit sun sensor 52, an acquisition sun sensor 54, an inertial reference unit 56, a transfer orbit Earth sensor 58, an operational orbit Earth sensor 60, a normal mode wide angle sun sensor 62, and a magnetometer 64.

The SCP 50 generates control signal commands 66 which are directed to a command decoder unit 68. The command decoder unit operates the load shedding and battery charging systems 69. The command decoder unit also sends signals to the magnetic torque control unit (MTCU) 70 and the torque coil 72.

The SCP 50 also sends control commands 74 to the thruster valve driver unit 76 which in turn controls the liquid apogee motor (LAM) thrusters 78 and the attitude control thrusters 80.

Wheel torque commands 82 are generated by the SCP and are communicated to the wheel speed electronics 84 and 86. These effect changes in the wheel speeds for wheels 24 and 30, respectfully. The speed of the wheels 24 and 30 is also measured and fed back to the SCP by feedback control signal 88.

The spacecraft control processor also sends jackscrew drive signals 90 to the platform assemblies 92 and 94 for the momentum wheels 24 and 30, respectively. These signals control the operation of the jackscrews individually and thus the amount of tilt of the momentum wheels. The position of the jackscrews is then fed back through command signal 96 to the spacecraft control processor. The signals 96 are also sent to the telemetry encoder unit 98 and in turn to the ground station 100.

The spacecraft control processor also sends command signals 110 to the telemetry encoder unit 98 which in turn sends feedback signals 112 to the SCP 50. This feedback loop, as with the other feedback loops to the SCP 50 described earlier, assist in the overall control of the spacecraft. The SCP 50 communicates with the telemetry encoder unit 98, which receives the signals from various spacecraft components and subsystems indicating current operating conditions, and then relays them to the ground station 100.

The wheel drive electronics 84, 86 receive signals from the SCP 50 and control the rotational speed of the momentum wheels. The jackscrew drive signals 90 adjust the orientation of the angular momentum vector of the wheels 24 and 30. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 50 includes and operates under control of an operating system stored in a memory. The SCP 50 accesses and manipulates data stored in the memory using the relationships and logic defined in resident applications. The SCP 50 can also be communicatively coupled to a communication link for communicating with a ground station 100 to accept data or programming instructions, and to transmit data to the ground station 100 computers.

In one embodiment, instructions implementing the operating system, the applications, are tangibly embodied in a computer-readable medium, e.g., data storage device, which could include one or more fixed or removable data storage devices, such as a, hard drive, CD-ROM drive, tape drive, etc. Further, the operating system and the computer program applications are comprised of instructions which, when read and executed by the SCP 50, causes the computer SCP 50 to perform the steps necessary to implement and/or use the present invention. Application and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media.

Figure 4:
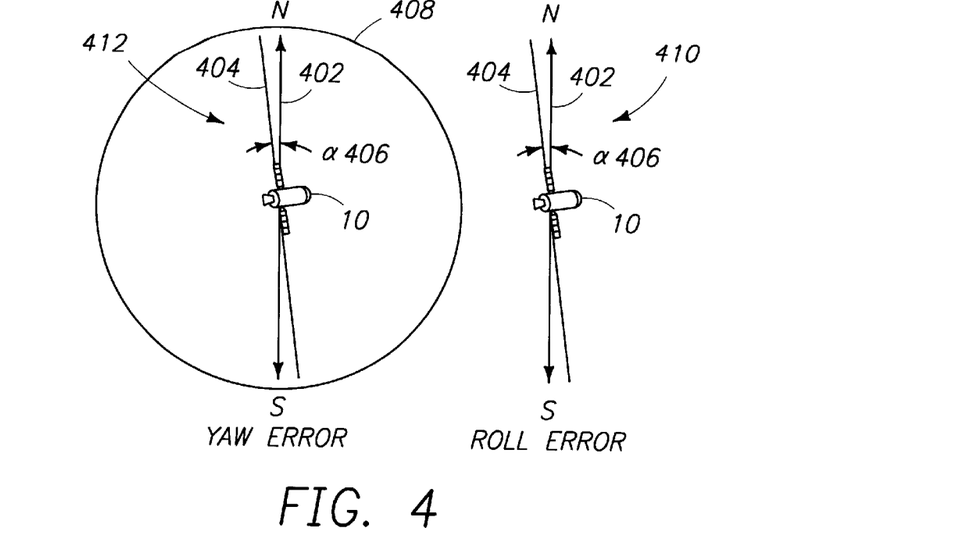
FIG. 4 is a diagram showing how yaw attitude sensing can be accomplished with a roll sensor in a momentum biased spacecraft 10.

FIG. 4 is a diagram showing how yaw attitude sensing can be accomplished with a momentum-biased spacecraft 10. When the spacecraft 10 is at a first orbital position 410, and at an attitude 404 biased away from the vertical North-South axis 402 by an angle α 406, it experiences an attitude error about its roll axis (which, at position 410 in FIG. 4, goes into the page), and no yaw error about the yaw axis (which points towards the earth). Assuming the spacecraft 10 attitude is fixed in inertial space and the yaw and roll axes rotate with the spacecraft 10, when the spacecraft orbits to second orbital position 412, the roll attitude error about the roll axis (extending to the right of the satellite in position 412) becomes zero and the yaw attitude error about the yaw axis (which points toward the earth 408 and is hence into the page in position 412) becomes α. This orbital coupling between the yaw and the roll axes can be used to sense attitude errors in one channel (e.g. yaw) using another channel (e.g. roll).

In the past, it was incorrectly believed that inversion of all momentum bias spacecraft 10 required a change in wheel spin direction 38 and 36, or the design of a new control law. Further, such a new control law design is severely limited in bandwidth by a non-minimum phase characteristic accompanying the plant zero at $[s^2+\Omega_0\lambda_0]$ when the sign of orbit rate $\Omega_0$, and nutation frequency $\lambda_0$ differ, as is the case after inversion. In the past, bi-directional momentum wheels were provided for just this eventuality. However, in many cases, the sign of wheel spin is hard-coded into wheel speed processing and fault protection algorithms, rendering it very undesirable to or impossible to reverse the direction of wheel rotation. The present invention recognizes for the first time the unique difference in inverted operation dynamics of momentum bias spacecraft controlled by internal or external torques and/or the elimination of the non-minimum phase problem with internal torque control.

The present invention provides a spacecraft momentum bias attitude stabilization approach that allows operation of the host spacecraft 10 in either an upright (pitch axis anti-orbit normal) or inverted (pitch axis orbit normal) without alteration of the control system hardware or control law. This facilitates the use of momentum bias with its advantages of relative passive stability and implicit yaw attitude sensing from a roll sensor only, while permitting arbitrary selection of upright or inverted yaw attitude, or altering the operating attitude at will during the life of the spacecraft. Further, spacecraft employing zero-momentum attitude stabilization techniques may be inverted at will, but do not enjoy the simplicity of stability and attitude sensing. Certain momentum-bias stabilized spacecraft well known in the art and employing external torque actuators do benefit from the momentum-bias characteristics, but cannot be inverted on orbit without providing for necessary hardware or software changes. The advantages of this invention are most significant for spacecraft already on orbit where an unforeseen need arises to continue or enhance the mission.

The small motion linearized dynamic equations of motion for an orbiting momentum bias spacecraft 10 can be derived having the form $$\Phi(s)=M_a^{-1}(s)P(s)M_a(s)\dot{h}(s) \tag{1}$$

where $\Phi$ represents attitude angular position variables (roll-pitch-yaw), $\dot{h}$ represents control torques applied by internal torquers, e.g., reaction wheels and P(s) is the Laplace transform of the vehicle dynamics including cross-coupling effects of nutation and orbit motion. For subsequent discussion we write this as $$\Phi(s)=M_a^{-1}(s)P(s)M_a(s)\dot{h}(s)=\bar{P}(s)\dot{h}(s)=M_a^{-1}(s)\hat{P}(s)\dot{h}(s)=\hat{P}(s-)M_a(s)\dot{h}(s). \tag{2}$$

The matrix $M_a^{-1}$ (s) is a representation of the orbital kinematics that relate or transform spacecraft body 12 rates into attitude angular rates, while the post multiplying matrix $M_a(s)$ is the actuator dynamic cross-coupling induced by interaction of reaction wheel momentum with spacecraft orbit rate motion. Note that in equation (2), $\tilde{P}(s)=M_a^{-1}(s)P(s)$ and $\hat{P}=P(S)M_a(s)$.

When external control torques, T(s) are used, the appropriate plant dynamics model is $$\Phi(s)=M_a^{-1}(s)P(s)T(s)=\tilde{P}(s)T(s). \tag{3}$$

In prior art systems, the plant $\tilde{P}(s)$ was generally used irrespective of whether a spacecraft 10 was controlled by external torques T, or internal torques $\dot{h}$. While this is the correct plant for external torque control, this plant has undesirable characteristics when the momentum bias spacecraft is inverted in yaw attitude, as is described below. In particular, $\tilde{P}(s)$ then exhibits a right half-plane zero or well-known non-minimum phase character. This either requires the adoption of a new controller, with bandwidth constrained by the non-minimum phase nature of the plant, or a physical reversal of the momentum wheel direction. This is necessary to align the orbit rate and the wheel momentum in the same direction. Reversal of the wheel direction returns $\tilde{P}(s)$ to the from it has in the upright attitude.

For reaction wheel controlled spacecraft the plant $\tilde{P}(s)$ is correct. However, the reaction wheel cross coupling $M_a(s)$ in the wheel dynamics $M_a(s)\dot{h}(s)$ has been treated in the past as an annoyance, for both upright and inverted spacecraft. As such, it was approximated as "small" and unimportant, or in some implementations approximately canceled by cross-coupling terms in the control law. Further, the prevailing knowledge has been that $\tilde{P}(s)$ applies to reaction wheel controlled momentum bias spacecraft and they suffer the above limitations if inverted on orbit without reversing the momentum wheel direction. This invention recognizes the correct plant, and exploit its benefits.

At first glance it perhaps surprising that the two transformations $M_a(s)$ and $M_a^{-1}(s)$ are so related since they seem to arise from disparate phenomena. However, the transformations both represent the same orbital to body coordinate coupling and maybe even transformation of the same momentum, since momentum is conserved in the model concerned, so any wheel momentum must be taken from the body and vise versa. The result is that $$\overline{P}(s) \approx P(s), \tag{4}$$

which allows the spacecraft to be inverted and maintain the same performance without modification of hardware or the control law. The approximate equality improves as dynamic imbalance products of inertia become smaller and transverse inertia asymmetry, difference between roll and yaw, decreases. In practical cases and in the limit, $P(s)$ and $\overline{P}(s)$ become identical except for a miniscule alteration in nutation frequency induced by the body orbit rate rotation, i.e., $$\lambda_s = (\sigma - 1)\Omega_0 + \frac{H_0}{I_T}, \tag{5}$$

where $\Omega_0$ changes sign with inversion.

Orbital Kinematics

Figure 5:
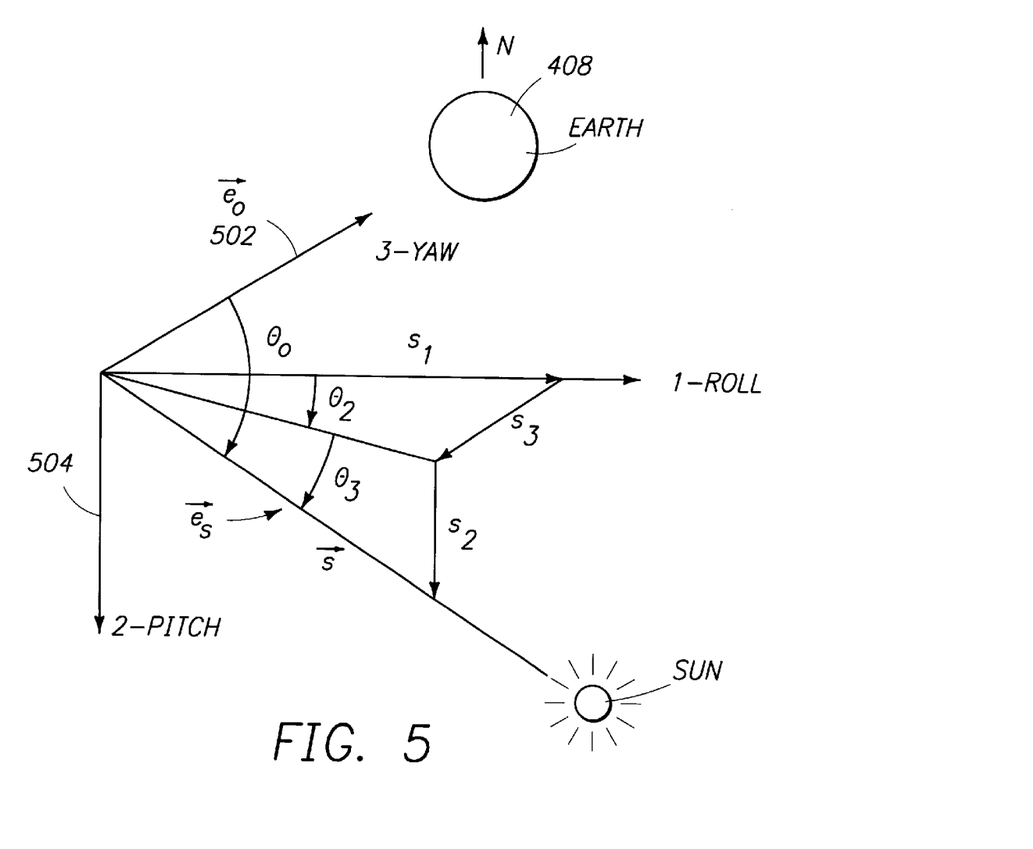
FIG. 5 is a diagram showing an orbital coordinate system.

FIG. 5 is a diagram showing an orbital coordinate system definition. Defining $e_O$ 502 as the local vertical orbital basis with the 3-Yaw axis directed along the vertical toward earth 408 and a 2-pitch axis orbit 504. A spacecraft body 12 body-fixed axis $e_b$ is displaced from $e_O$ by the rotation B, where $$e_b = B(\phi_3, \phi_2, \phi_1)e_o \tag{6}$$

$$= B_3(\phi_3)B_2(\phi_2)B_1(\phi_1)e_o \tag{7}$$

$$= \begin{bmatrix} \cos\phi_3 & \sin\phi_3 & 0 \\ -\sin\phi_3 & \cos\phi_3 & 0 \\ 0 & 0 & 1 \end{bmatrix} \begin{bmatrix} \cos\phi_2 & 0 & -\sin\phi_2 \\ 0 & 1 & 0 \\ \sin\phi_2 & 0 & \cos\phi_2 \end{bmatrix} \begin{bmatrix} 1 & 0 & 0 \\ 0 & \cos\phi_1 & \sin\phi_1 \\ 0 & -\sin\phi_1 & \cos\phi_1 \end{bmatrix} e_o \tag{8}$$

$$= \begin{bmatrix} \cos\phi_2\cos\phi_3 & \sin\phi_1\sin\phi_2\cos\phi_3 + \cos\phi_1\sin\phi_3 & -\cos\phi_1\sin\phi_2\cos\phi_3 + \sin\phi_1\sin\phi_3 \\ -\cos\phi_2\sin\phi_3 & -\sin\phi_1\sin\phi_2\sin\phi_3 + \cos\phi_1\cos\phi_3 & \cos\phi_1\sin\phi_2\sin\phi_3 + \cos\phi_1\cos\phi_3 \\ \sin\phi_2 & -\sin\phi_1\cos\phi_2 & \cos\phi_1\cos\phi_2 \end{bmatrix} e_o \tag{9}$$

$$\approx \begin{bmatrix} \cos\phi_3 & \sin\phi_3 & -\phi_2\cos\phi_3 + \phi_1\sin\phi_3 \\ -\sin\phi_3 & \cos\phi_3 & \phi_2\sin\phi_3 + \phi_1\cos\phi_3 \\ \phi_2 & -\phi_1 & 1 \end{bmatrix} e_o \approx \begin{bmatrix} 1 & \phi_3 & -\phi_2 \\ -\phi_3 & 1 & \phi_1 \\ \phi_2 & -\phi_1 & 1 \end{bmatrix} e_o. \tag{10}$$

where , $\phi_1$, $\phi_2$, $\phi_3$ are respectively, roll, pitch, and yaw attitude angle errors. In the first approximations, roll and pitch are taken as small, and in the second approximation, all three errors are small angles. The body angular rate with respect to $e_O$ is:

$$\Phi = e_b^T \begin{bmatrix} \dot\phi_2\sin\phi_3 + \dot\phi_1\cos\phi_2\cos\phi_3 \\ \dot\phi_2\cos\phi_3 - \dot\phi_1\cos\phi_2\sin\phi_3 \\ \dot\phi_3 + \dot\phi_1\sin\phi_2 \end{bmatrix} \tag{11}$$

$$= e_o^T \begin{bmatrix} \dot\phi_1 + \dot\phi_3\sin\phi_2 \\ \dot\phi_2\cos\phi_1 - \dot\phi_3\sin\phi_1\cos\phi_2 \\ \dot\phi_2\sin\phi_1 + \dot\phi_3\cos\phi_1\cos\phi_2 \end{bmatrix} \approx e_b^T \begin{bmatrix} \dot\phi_1 \\ \dot\phi_2 \\ \dot\phi_3 \end{bmatrix} \approx e_o^T \begin{bmatrix} \dot\phi_1 \\ \dot\phi_2 \\ \dot\phi_3 \end{bmatrix}.$$

The orbital angular rate is expressed as:

$$\Omega_o = e_o^T \begin{bmatrix} 0 \\ -\Omega_o \\ 0 \end{bmatrix} = e_b^T[-\Omega_o] \begin{bmatrix} \sin\phi_1\sin\phi_2\cos\phi_3 + \cos\phi_1\sin\phi_3 \\ -\sin\phi_1\sin\phi_2\sin\phi_3 + \cos\phi_1\cos\phi_3 \\ -\sin\phi_1\cos\phi_2 \end{bmatrix} \tag{12}$$

$$\approx e_b^T[-\Omega_o] \begin{bmatrix} \sin\phi_3 \\ \cos\phi_3 \\ -\phi_1 \end{bmatrix} \approx e_b^T[-\Omega_o] \begin{bmatrix} \phi_3 \\ 1 \\ -\phi_1 \end{bmatrix}$$

Summing equations (11) and (12), the body inertial angular rate becomes:

$$\omega = \Omega_0 + \Phi = e_b^T[\omega_1, \omega_2, \omega_3]^T = e_b^T[\dot\phi_1 - \phi_3\Omega_o, \dot\phi_2 - \Omega_o, \dot\phi_3 + \phi_1\Omega_o]^T \tag{13a}$$

In the Laplace domain, the relation between spacecraft body rates and spacecraft attitude rates can be expressed as:

$$\omega(s) = e_b^T \begin{bmatrix} 1 & 0 & -\frac{\Omega_o}{s} \\ 0 & 1 & 0 \\ \frac{\Omega_o}{s} & 0 & 1 \end{bmatrix} \begin{bmatrix} \dot{\phi}_1(s) \\ \dot{\phi}_2(s) \\ \dot{\phi}_3(s) \end{bmatrix} + \Omega_o = e_b^T M_a \Phi(s) + \Omega_o \quad (13b)$$

or, inverting:

$$\Phi(s) = e_b^T M_a^{-1} [\omega(s) - \Omega_o] \quad (13c)$$

$$= e_b^T M_a^{-1} \omega(s) - \Omega_o$$

$$= e_b^T \frac{s^2}{s^2 + \Omega_o^2} \begin{bmatrix} 1 & 0 & \frac{\Omega_o}{s} \\ 0 & \frac{[s^2 + \Omega_o^2]}{s^2} & 0 \\ -\frac{\Omega_o}{s} & 0 & 1 \end{bmatrix} \omega(s) - \Omega_o$$

Vehicle Momentum

Assuming a momentum bias $H_0$ is stored along the negative pitch axis and small momentum storage capability $h = e_b[h_1, h_2, h_3]^T$ along all three body axes. The latter might be provided by reaction wheels or by small angle gimbaling of the larger pitch wheel. Then, the total angular momentum $$H = I \cdot \omega + e_b^T \begin{bmatrix} h_1 \\ h_2 - H_o \\ h_3 \end{bmatrix} \quad (14)$$

$$= e_b^T \begin{bmatrix} I_{11}\omega_1 - I_{12}\omega_2 - I_{13}\omega_3 \\ -I_{12}\omega_1 + I_{22}\omega_2 - I_{23}\omega_3 \\ -I_{13}\omega_1 - I_{23}\omega_2 + I_{13}\omega_3 \end{bmatrix} + e_b^T \begin{bmatrix} h_1 \\ h_2 - H_o \\ h_3 \end{bmatrix}.$$

Torque Equations

Forming the time derivative and equating to external torques $$\dot{H} + \omega \times H = T \quad (15)$$

$$= e_b^T \begin{bmatrix} I_{11}\dot{\omega}_1 - I_{12}\dot{\omega}_2 - I_{12}\dot{\omega}_3 \\ -I_{12}\dot{\omega}_1 + I_{22}\dot{\omega}_2 - I_{23}\dot{\omega}_3 \\ -I_{13}\dot{\omega}_1 - I_{23}\dot{\omega}_2 + I_{13}\dot{\omega}_3 \end{bmatrix} + e_b^T \begin{bmatrix} \dot{h}_1 \\ \dot{h}_2 - \dot{H}_o \\ \dot{h}_3 \end{bmatrix} + \quad (16)$$

$$e_b^T \begin{bmatrix} [I_{33} - I_{22}]\omega_2\omega_3 + I_{12}\omega_1\omega_3 - I_{13}\omega_1\omega_2 + I_{23}[\omega_3^2 - \omega_2^2] \\ [I_{11} - I_{33}]\omega_1\omega_3 - I_{12}\omega_2\omega_3 + I_{23}\omega_1\omega_2 + I_{13}[\omega_1^2 - \omega_3^2] \\ [I_{22} - I_{11}]\omega_1\omega_2 + I_{13}\omega_2\omega_3 - I_{23}\omega_1\omega_3 + I_{12}[\omega_2^2 - \omega_1^2] \end{bmatrix} +$$

$$e_b^T \begin{bmatrix} \omega_2 h_3 - \omega_3[h_2 - H_o] \\ \omega_3 h_1 - \omega_1 h_3 \\ \omega_1[h_2 - H_o] - \omega_2 h_1 \end{bmatrix}.$$

For a balanced spacecraft:

$$e_b^T \begin{bmatrix} I_{11}\dot{\omega}_1 + [I_{33} - I_{22}]\omega_2\omega_3 + \dot{h}_1 + \omega_2 h_3 - \omega_3[h_2 - H_o] \\ I_{22}\dot{\omega}_2 + [I_{11} - I_{33}]\omega_1\omega_3 + \dot{h}_2 - \dot{H}_o - \omega_1 h_3 + \omega_3 h_1 \\ I_{33}\dot{\omega}_3 + [I_{22} - I_{11}]\omega_1\omega_2 + \dot{h}_3 - \omega_2 h_1 - \omega_1[h_2 - H_o] \end{bmatrix} = T. \quad (17)$$

Assuming $\Omega_0$ is constant, and linearizing equation (17) with respect to small perturbations $\phi$ and $h$ about their nominal zero value:

$$e_b^T \begin{bmatrix} I_{11}\dot{\omega}_1 + [(I_{33} - I_{22})\Omega_o + H_o]\omega_3 \\ I_{22}\dot{\omega}_2 \\ I_{33}\dot{\omega}_3 - [(I_{11} - I_{22})\Omega_o + H_o]\omega_1 \end{bmatrix} \quad (18)$$

$$= e_b^T \begin{bmatrix} \Omega_o h_3 - \dot{h}_1 + T_1 \\ -\dot{h}_2 + T_2 \\ \Omega_o h_1 - \dot{h}_3 + T_3 \end{bmatrix} = e_b^T \hat{T}$$

where T represents external torques acting on the spacecraft body. Defining $$\lambda_1 = \frac{[(I_{33} - I_{22})\Omega_o + H_o]}{I_{11}} = \left[\left(\frac{I_{33}}{I_{11}} - \sigma_1\right)\Omega_o + \frac{H_o}{I_{11}}\right], \text{ and} \quad (19a)$$

$$\lambda_2 = \frac{[(I_{11} - I_{22})\Omega_o + H_o]}{I_{33}} = \left[\left(\frac{I_{11}}{I_{33}} - \sigma_3\right)\Omega_o + \frac{H_o}{I_{33}}\right], \quad (19b)$$

the foregoing can be transformed and rewritten as $$P(s)^{-1}\omega = \hat{T} \quad (20)$$

$$= \begin{bmatrix} I_{11}s - I_{13}\Omega_o & -I_{12}s & -[I_{13}s - I_{11}\lambda_1] \\ -I_{12}s + I_{23}\Omega_o & I_{22}s & -I_{23}s - I_{12}\Omega_o \\ -[I_{13}s + I_{33}\lambda_3] & -I_{23}s & I_{33}s + I_{13}\Omega_o \end{bmatrix}$$

$$\begin{bmatrix} \omega_1 \\ \omega_2 \\ \omega_3 \end{bmatrix} \rightarrow \begin{bmatrix} I_{11}s & 0 & I_{11}\lambda_1 \\ 0 & I_{22}s & 0 \\ -I_{33}\lambda_3 & 0 & I_{33}s \end{bmatrix} \begin{bmatrix} \omega_1 \\ \omega_2 \\ \omega_3 \end{bmatrix}$$

and, $$\omega = P(s)\hat{T} \quad (21)$$

$$= \begin{bmatrix} P_{11} & P_{12} & P_{13} \\ P_{21} & P_{22} & P_{23} \\ P_{31} & P_{32} & P_{33} \end{bmatrix} \hat{T}$$

$$= \frac{\begin{bmatrix} I_{22}I_{33}s^2 & 0 & -I_{11}I_{22}\lambda_1 s \\ 0 & I_{11}I_{33}[s^2 + \lambda_o^2] & 0 \\ I_{22}I_{33}\lambda_3 s & 0 & I_{11}I_{22}s^2 \end{bmatrix} \hat{T}}{I_{11}I_{22}I_{33}s[s^2 + \lambda_o^2]},$$

where the inertial nutation frequency, in body coordinates $\lambda_o$ is defined as:

$$\lambda_o = \sqrt{\lambda_1 \lambda_3}. \quad (22)$$

This formulation of the vehicle dynamics is in spacecraft body coordinates with inertial rates as the plant output. This is analytically convenient when inertial rate sensors such as gyros are used for vehicle control.

Note that the input torque $\hat{T}$, which is shown in the right half of equation (18), can be expressed in Laplace form as:

$$\hat{T} = M_a \dot{h}(s) + [T_1(s), T_2(s), T_3(s)]^T = M_a(s)[\dot{h}_1(s), \dot{h}_2(s), \dot{h}_3(s)]^T + [T_1(s), T_2(s), T_3(s)]^T \quad (22)$$

where $\dot{h}_i$ are inertial wheel torques, and the $T_i$ are external torques. The response can be expressed in terms of "attitude" rates $\dot{\phi}$, rather than "body" rates $\omega$, as $$\dot{\Phi}(s) - \Omega_o = M_a^{-1}\omega(s) = M_a^{-1}P(s)\hat{T} = M_a^{-1}P(s)[M_a \dot{h}(s) + T] \quad (23)$$

The spacecraft dynamics Laplace transform can therefore be expressed in three different forms as:

$$\bar{P}(s) = M_a^{-1}P(s)M_a = \tilde{P}(s)M_a = M_a^{-1}\hat{P}(s) \rightarrow P(s); I_{11}/I_{33} \rightarrow 1 \quad (24)$$

The simplest plant model, P(s) expanded in equation (21), applies when external torques are used for control and body rates, perhaps combined with the integral of the body rates, are the modeled output and/or control feedback variable.

The form $\hat{P}(s)=M_z^{-1}P(s)$ applies when the torques are external and the output is attitude variables $\dot{\phi}$ or $\phi$. The plant $\hat{P}(s)=P(s)M_a$ applies when reaction or momentum wheel control actuation is used and $\omega$ or its integral is the controlled variable. This formulation is correct for either pure reaction wheel control or small angle CMG control. It is worthy to note also that this is the plant form encountered for reaction wheel control of spinning spacecraft, in the present case, 'spinning' at an orbital rate about the 2-axis (pitch), but also familiar in an altered permutation for the application of gyro/wheel inactive nutation control (GWANC), where the spacecraft spins at a rate $\omega_s$ about the 3-axis (yaw). Finally, the case $\hat{P}(s)=M_a^{-1}P(s)M_a$ is applicable to combined reaction wheel control and attitude variable measurement. This reduces to the simple P(s) under inertial symmetry.

Figure 6:
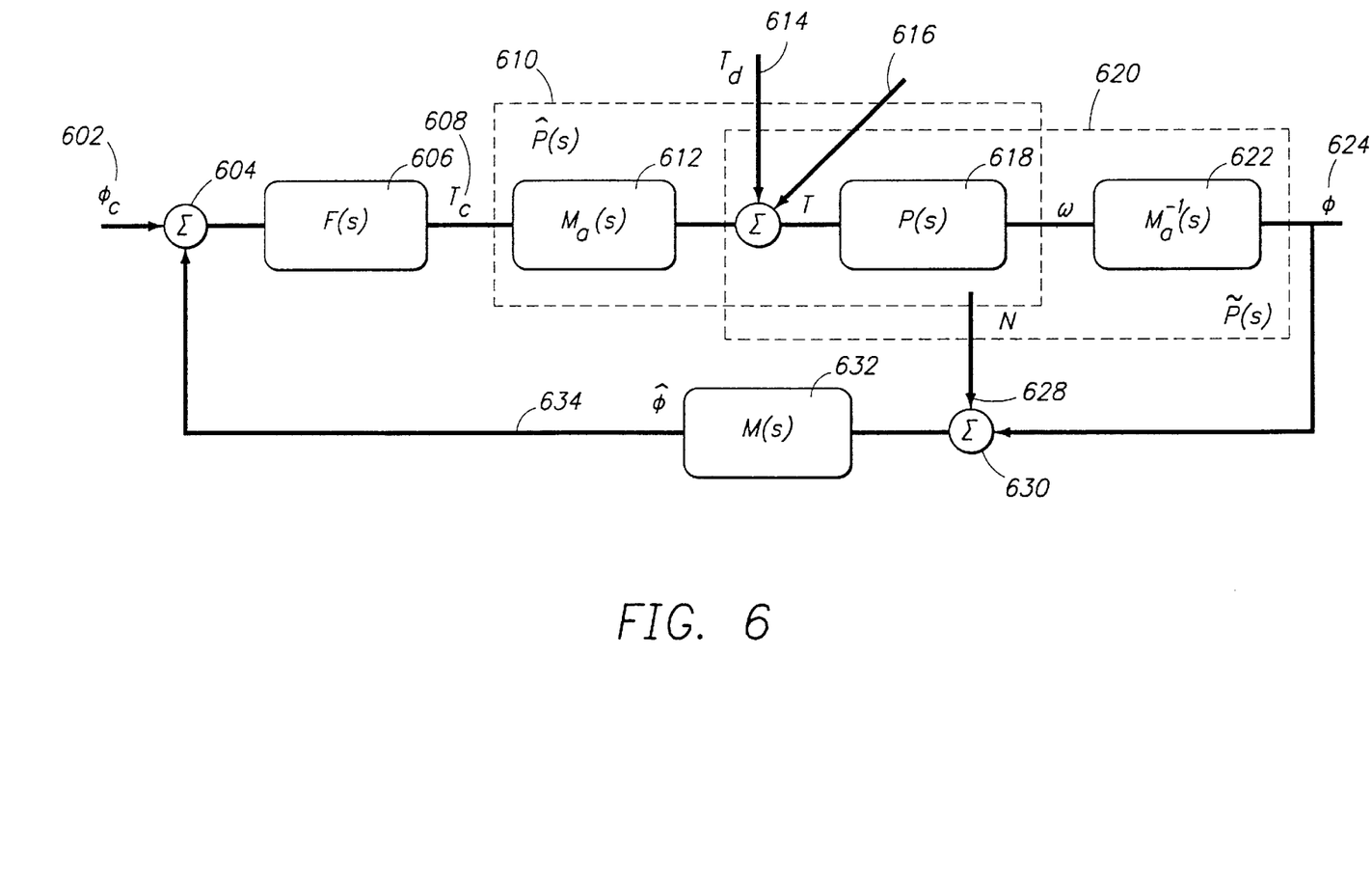
FIG. 6 is a generalized multi-variable model of a spacecraft attitude control system.

FIG. 6 presents a generalized multi-variable state space model of the spacecraft 10 attitude control system, showing an implementation of a control law. The attitude control system accepts an attitude angular command 602. The angular command is compared to a measured attitude angle 634 via an error signal summing junction 604 to generate an error signal. The error signal is provided to error signal compensation 606 to provide a torque command $T_c$ 608. Plant model P(s) 618 represents the spacecraft 10 dynamics, while $M_a(s)$ represents the momentum wheel cross coupling dynamics 612. The reaction wheel plant model $\hat{P}(s)=P(s)M_a(s)$ 610 applies when reaction or momentum wheel actuation is used. Undesired disturbance torques 614 or desired external torques 616 are also applied to the plant model. $M_a^{-1}(s)$ represents spacecraft dynamics cross coupling 622 with the orbital angular rate. External torque plant model 620 $\hat{P}(s)=M_a^{-1}P(s)$ applies when the torques are external and the output is attitude variables $\dot{\phi}$ or $\phi$. Angular attitude sensor having dynamics 632 measures the attitude angle 624 are represented by M(s) to produce a measured value 634. Additive sensor noise is modeled by a noise vector 628 and summing junction 630.

Figure 7:
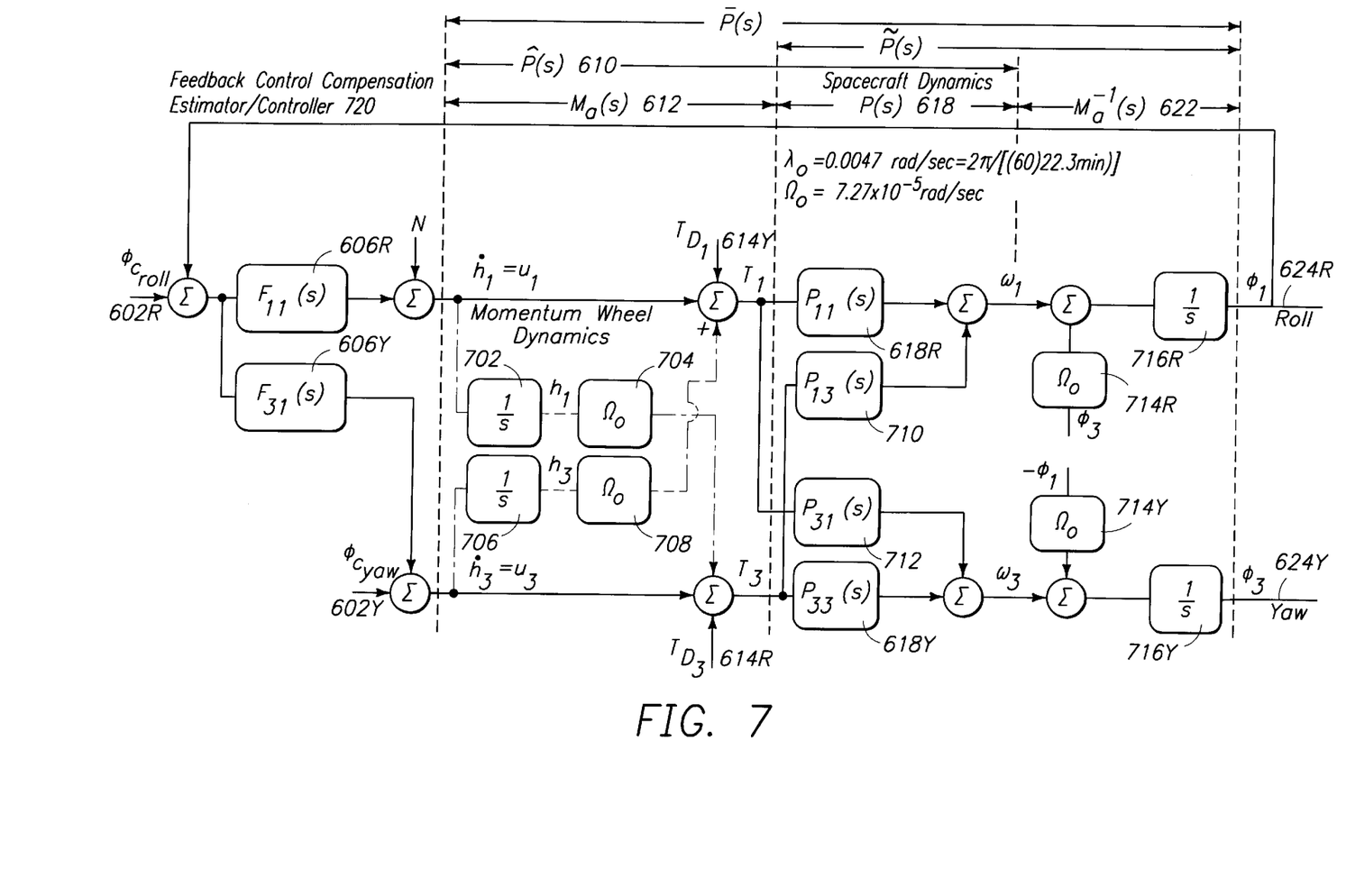
FIG. 7 illustrates a detailed block diagram of the spacecraft attitude control system, showing the cross-coupled roll-yaw dynamics and feedback of a momentum bias stabilized spacecraft.

FIG. 7 is a detailed block diagram of the attitude control system, showing the cross-coupled roll-yaw dynamics and feedback of a momentum bias stabilized spacecraft 10. A roll channel command 602R and yaw channel command 602Y are supplied to the attitude control system, and the difference between the command and the roll angle is provided to a roll compensation 606R and to yaw compensation 606Y. The output from the roll compensation 606R is the roll torque command and the output from the yaw compensation 606Y is the yaw torque command, after sensor noise is suitably accounted for, the model next considers the spacecraft momentum wheel dynamics $M_a(s)$ 612. The product of the orbital rate $\Omega_0$ and the integral of the yaw torque command cross couples into the roll channel. Similarly, the product of the orbital rate $\Omega_0$ cross couples into the yaw channel, as shown in blocks 702–708. The effect of roll disturbance torques 614R and yaw disturbance torques 6141Y on the commanded torques are accounted for, and the resulting torques ($T_1$ for the roll channel and $T_3$ for the yaw channel) are provided to the plant 618. Plant 618 includes in-channel roll plant dynamics 618R and in-channel roll plant dynamics 618Y, as well as yaw to roll channel plant cross coupling dynamics 710 and roll to yaw channel plant cross coupling dynamics 712, thus producing a roll body rate $\omega_1$ and a yaw body rate $\omega_3$. The spacecraft dynamic cross coupling with the orbital dynamics $M_a^{-1}(s)$ 622 includes a yaw to roll spacecraft dynamic cross coupling factor 714R and a roll to yaw spacecraft dynamic cross coupling factor 714Y. Cross coupling and in-channel components are integrated by roll channel integrator 716R and yaw channel integrator 716Y, respectively.

Figure 8:
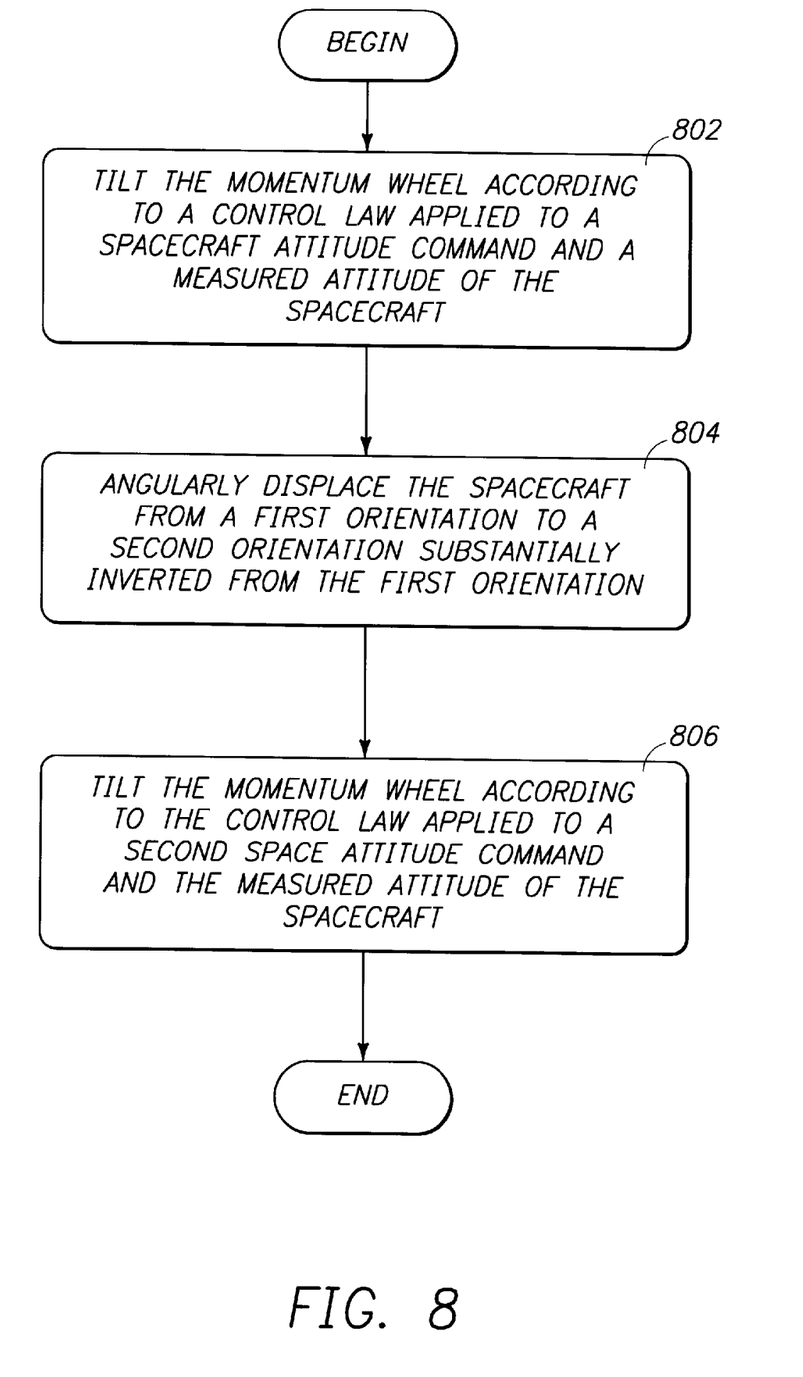
FIG. 8 is a flow chart showing exemplary process steps used to practice one embodiment of the present invention.

FIG. 8 is a flow chart presenting exemplary process steps used to practice one embodiment of the present invention. First, the attitude of the spacecraft 10 is controlled and stabilized by tilting the momentum or reaction wheel 30 according to a control law such as that which is illustrated in FIGS. 6 and 7 applied to a spacecraft attitude command 602 and a measured attitude 634 of the spacecraft 10. This is shown in block 802. Next, the spacecraft 10 is angularly displaced from a first orientation to a second orientation substantially inverted from the first orientation, as shown in block 804. This is typically performed in response to another spacecraft attitude command, and can be accomplished by use of reaction or momentum wheels, or with external torque sources such as magnetic torquers, thrusters, solar sails, or similar devices. Next, spacecraft is stabilized in the inverted orientation with the momentum or reaction wheel spinning in the same direction by tilting the momentum wheel according to the same control law applied to the second spacecraft attitude command and measured spacecraft attitude. This is illustrated in block 806. As described above, the foregoing steps can be performed with a momentum wheel or a reaction wheel without loss of generality.

Figure 9:
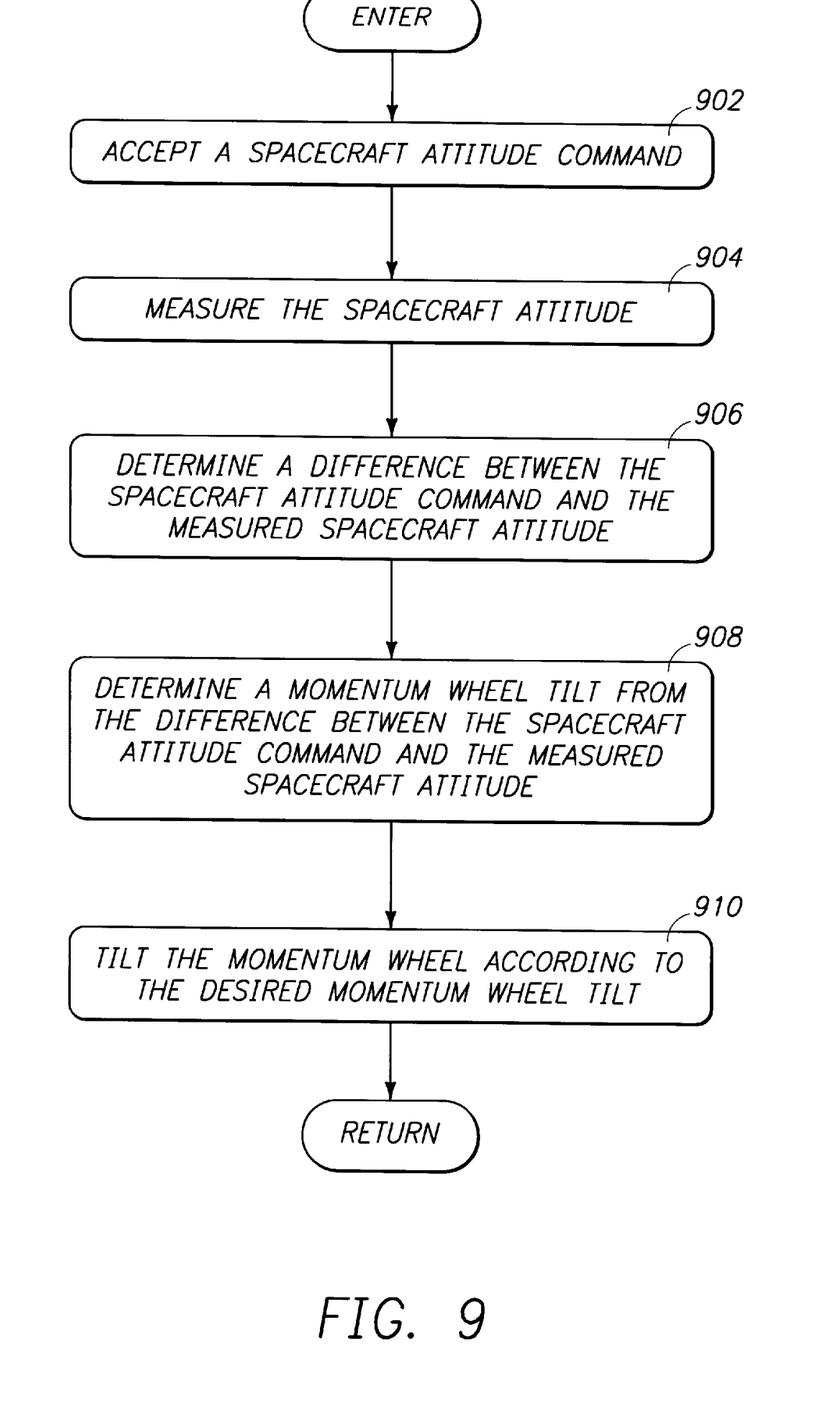
FIG. 9 is a flow chart showing exemplary method steps used to tilt the momentum wheel according to the control law.

FIG. 9 is a flow chart presenting exemplary method steps used to tilt the momentum wheel according to the control law. First, a spacecraft attitude command 602 is accepted, as shown in block 902. This attitude command 602 is compared to a measured spacecraft attitude 634 to determine an error signal. This is illustrated in block 904 and 906. The error signal represents the difference between the measured and commanded spacecraft attitude. The control law operates on this error signal to determine a momentum wheel tilt, as shown in block 908. Finally, the momentum or reaction wheel 30 is tilted according to the determined momentum wheel tilt, as shown in block 910.

Figure 10:
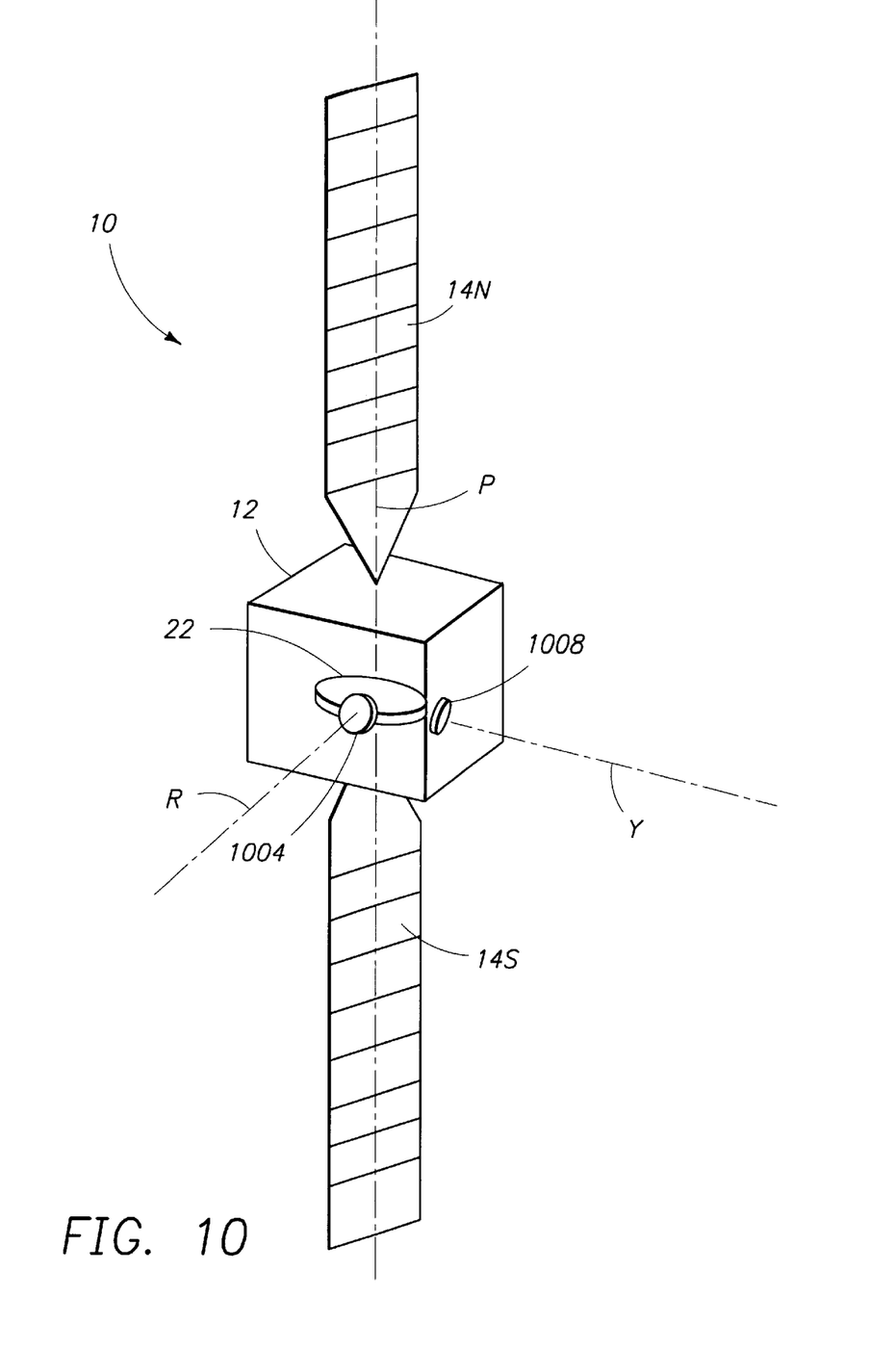
FIG. 10 is a diagram illustrating another embodiment of the present invention.

FIG. 10 is a diagram illustrating another embodiment of the present invention. In this embodiment, attitude control authority is not provided by a gimbaled momentum wheel, but rather by altering the rotation speed of one or more secondary momentum wheels such as roll secondary momentum wheel 1004 and yaw secondary momentum wheel 1008. This is accomplished via suitable command from the SCP 50, based on spacecraft dynamic measurements. Secondary momentum wheel 1004 rotates about an axis R sufficiently normal to the axis of rotation P for momentum wheel 22.

Figure 11:
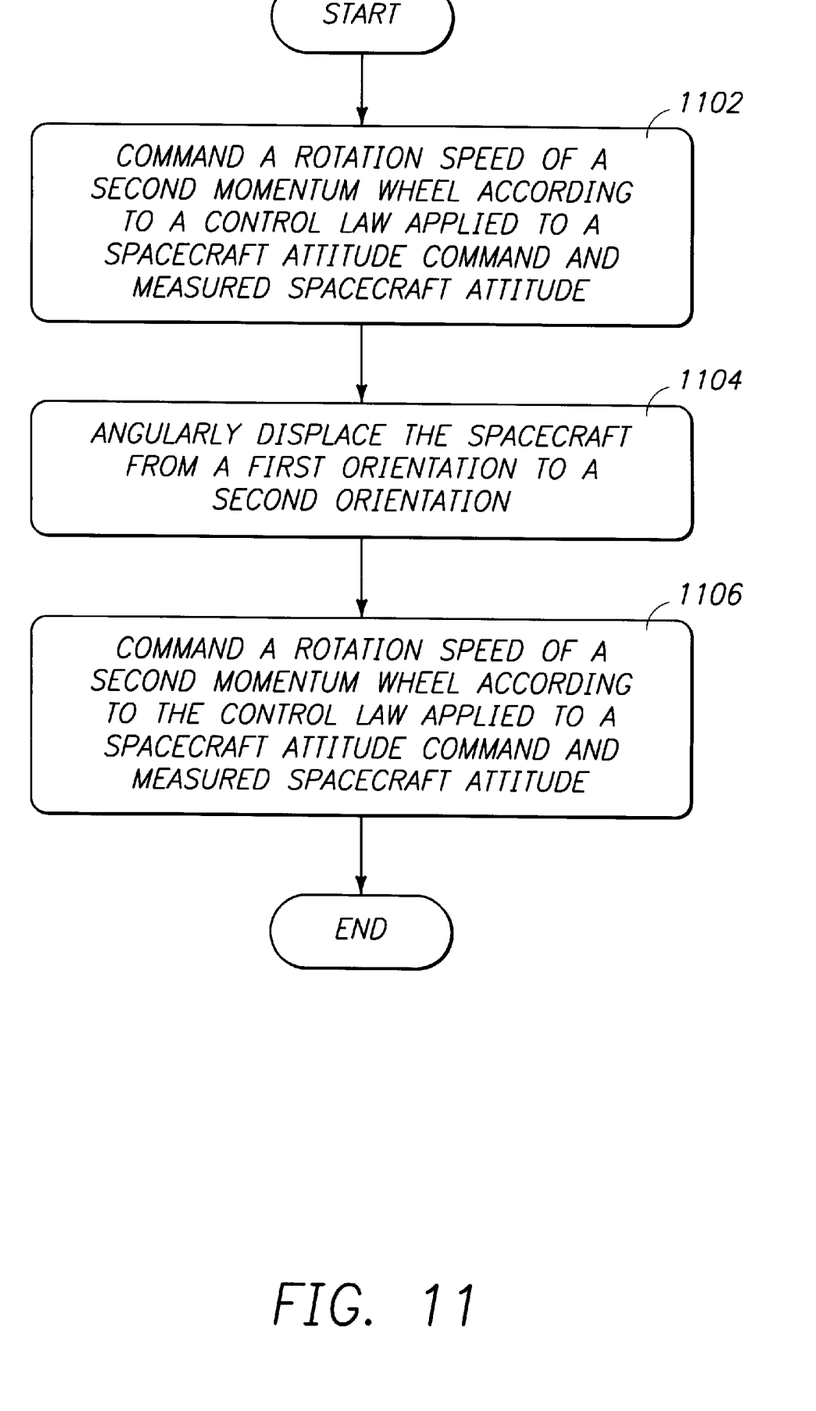
FIG. 11 is a flow chart presenting exemplary process steps used to practice the embodiment illustrated in FIG. 10.

FIG. 11 is a flow chart presenting exemplary process steps used to practice the embodiment illustrated in FIG. 10. When an adjustment to the spacecraft 10 attitude is required, the rotation speed of one or both of the secondary momentum wheels 1004 and 1008 is commanded according a control law applied to a spacecraft attitude command and a spacecraft measured attitude, as shown in block 1102. The spacecraft 10, can then be inverted by angularly displacing 1104 the spacecraft 10 from a first orientation to a second orientation substantially inverted from the first orientation. Thereafter, the attitude of the spacecraft 10 is controlled by commanding the rotation speed of the secondary momentum wheel according to the same control law applied to the spacecraft attitude command and attitude measurements. This is shown in block 1106.

Conclusion

This concludes the description of the preferred embodiments of the present invention. In summary, the present invention discloses a method, apparatus, article of manufacture, and a memory structure for controlling a spacecraft having a first axis. The apparatus comprises a momentum wheel unidirectionally rotatable about a spin axis substantially co-aligned with the first axis; a momentum wheel mount for tilting the momentum wheel about at least one of two axes substantially orthogonal to the spin axis; and a processor in communication with the momentum wheel and the momentum wheel mount. The processor commands either the momentum wheel speed or the momentum wheel tilting to control the attitude of the spacecraft in a first orientation and in a second orientation inverted from the first along the first axis, using the same control law.

The method comprises the steps of tilting the momentum wheel according to the control law as applied to a spacecraft attitude command and a measured attitude of the spacecraft; angularly displacing the spacecraft from a first orientation to a second orientation substantially inverted from the first orientation, and tilting the momentum wheel according to the same control law applied to the spacecraft altitude command or a new command and the measured attitude of the spacecraft. The article of manufacture comprises a program or data storage device tangibly embodying instructions to perform the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing has been described with respect to momentum wheels rotating about axes that are perpendicular to one another, the present invention can be practiced with the use of momentum wheels that are sufficiently normal to describe a three dimensional control space for the spacecraft 10.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A spacecraft attitude control system for controlling a spacecraft having a first axis, comprising:
    a momentum wheel unidirectionally rotatable about a spin axis substantially co-aligned with the first axis; and
    a momentum wheel mount for tilting of the momentum wheel about at least one of two axes substantially orthogonal to the spin axis; and
    a processor in communication with the momentum wheel and the momentum wheel mount, the processor for commanding a parameter selected from a group comprising a momentum wheel speed and the momentum wheel tilting to control the attitude of the spacecraft in a first orientation and a second orientation according to a control law, wherein the second orientation is substantially inverted from the first orientation along the first axis.

2. The apparatus of claim 1, wherein the rotation of the momentum wheel produces a momentum directed along the first spin axis.

3. The apparatus of claim 1, wherein the momentum wheel mount comprises a gimbal.

4. The apparatus of claim 1, wherein the momentum wheel mount comprises a two-degree-of-freedom flexible pivot.

5. The apparatus of claim 1, wherein the momentum wheel mount comprises a jackscrew mechanism.

6. A spacecraft attitude control system for controlling a spacecraft having a first axis, comprising:
    a momentum wheel rotating unidirectionally about a spin axis substantially co-aligned with the first axis, wherein the rotation of the momentum wheel produces a momentum directed along the first spin axis, and
    a momentum wheel mount for controlling tilting of the momentum wheel about at least one of two axes substantially orthogonal to the spin axis; and
    a processor in communication with the momentum wheel and the momentum wheel mount, the processor for commanding a parameter selected from a group comprising a momentum wheel speed and the momentum wheel tilting to control the attitude of the spacecraft in a first orientation according to a control law and to control the attitude of the spacecraft in a second orientation substantially inverted from the first orientation along the first axis according to the control law.

7. A spacecraft attitude control system for controlling a spacecraft having a first axis, comprising:
    a momentum wheel rotatatable in a direction about a spin axis substantially co-aligned with the first axis, wherein the rotation of the momentum wheel produces a momentum directed along the first spin axis, and
    a momentum wheel mount for controlling tilting of the momentum wheel about at least one of two axes substantially orthogonal to the spin axis; and
    a processor in communication with the momentum wheel and the momentum wheel mount, the processor for commanding a parameter selected from a group comprising a momentum wheel speed and the momentum wheel tilting according to a control law to control the attitude of the spacecraft in a first orientation and a second orientation substantially inverted from the first orientation without modification of the control law and without reversing the rotation of the momentum wheel.

8. A method of controlling the attitude of a spacecraft having a first axis and a momentum wheel unidirectionally rotating about a spin axis substantially co-aligned with the first axis wherein the momentum wheel is coupled to a momentum wheel mount for tilting the momentum wheel about at least one of two axes substantially orthogonal to the spin axis, comprising the steps of:
    tilting the momentum wheel according to a control law applied to a spacecraft attitude command and a measured attitude of the spacecraft;
    angularly displacing the spacecraft from a first orientation to a second orientation substantially inverted from the first orientation; and
    tilting the momentum wheel according to the control law applied to a second spacecraft attitude command and the measured attitude of the spacecraft.

9. The method of claim 8, wherein the second orientation is substantially inverted from the first orientation along the first axis.

10. The method of claim 9, wherein the step of angularly displacing the spacecraft from a first orientation to a second orientation comprises the step of applying an external torque to the spacecraft.

11. The method of claim 9, wherein control law is applied to a difference between the spacecraft attitude command and a measured attitude of the spacecraft.

12. The method of claim 9, wherein the step of tilting the momentum wheel according to the control law applied to the spacecraft attitude command and the measured attitude of the spacecraft comprises the steps of:

accepting a spacecraft attitude command;

measuring the spacecraft attitude;

determining a difference between the spacecraft attitude command and the measured spacecraft attitude;

determining a momentum wheel tilt from the difference between the spacecraft attitude command and the measured spacecraft attitude; and tilting the momentum wheel according to the determined momentum wheel tilt.

13. The method of claim 9, wherein the momentum wheel mount comprises a gimbal.

14. The method of claim 9, wherein the momentum wheel mount comprises a two-degree-of-freedom flexible pivot.

15. The hod of claim 9, wherein the momentum wheel mount comprises a jackscrew mechanism.

16. A program storage device, readable by a computer, tangibly embodying at least one program of instructions executable by the computer to perform method steps of controlling the attitude of a spacecraft, wherein the spacecraft has a first axis and a momentum wheel unidirectionally rotating about a spin axis substantially co-aligned with the first axis and wherein the momentum wheel is coupled to a momentum wheel mount for tilting the momentum wheel about at least one of two axes substantially orthogonal to the spin axis, the method steps comprising the steps of:

tilting the momentum wheel according to a control law applied to a spacecraft attitude command and a measured attitude of the spacecraft;

angularly displacing the spacecraft from a first orientation to a second orientation substantially inverted from the first orientation; and tilting the momentum wheel according to the control law applied to a second spacecraft attitude command and the measured attitude of the spacecraft.

17. The program storage device of claim 16, wherein the method steps of tilting the momentum wheel according to the control law applied to the spacecraft attitude command and the measured attitude of the spacecraft comprises the method steps of:

accepting a spacecraft attitude command;

measuring the spacecraft attitude;

determining a difference between the spacecraft attitude command and the measured spacecraft attitude;

determining a momentum wheel tilt from the difference between the spacecraft attitude command and the measured spacecraft attitude; and tilting the momentum wheel according to the determined momentum wheel tilt.

18. A spacecraft attitude control system for controlling a spacecraft having a first axis, comprising:

a first momentum wheel unidirectionally rotatable about a spin axis substantially co-aligned with the first axis; and at least one second momentum wheel, rotatable about a spin axis substantially orthogonal to the first axis; and a processor in communication with the first momentum wheel and the second momentum wheel, the processor for commanding a parameter selected from a group comprising a first momentum wheel speed and a second momentum wheel speed to control the attitude of the spacecraft in a first orientation and a second orientation according to a control law, wherein the second orientation is substantially inverted from the first orientation along the first axis.

19. The apparatus of claim 18, further comprising a third momentum wheel, rotatable about a third axis substantially orthogonal to the first axis and the second axis, wherein the parameter is selected from the group further comprising a third momentum wheel speed.

20. A method of controlling an attitude of a spacecraft having a first axis and a momentum wheel unidirectionally rotating about a spin axis substantially co-aligned with the first axis, comprising the steps of:

commanding a rotation speed of a second momentum wheel rotating about a spin axis substantially normal to the first axis according to a control law applied to a spacecraft attitude command and a measured attitude of the spacecraft;

angularly displacing the spacecraft from a first orientation to a second orientation substantially inverted from the first orientation; and commanding the rotation speed of the second momentum wheel according to the control law applied to a second spacecraft attitude command and the measured attitude of the spacecraft.

* * * * *